United States Patent
Diaz Vico et al.

(10) Patent No.: US 12,095,900 B2
(45) Date of Patent: Sep. 17, 2024

(54) LINKING A PHYSICAL IDENTIFIER TO A DIGITAL IDENTIFIER

(71) Applicant: INTERNATIONAL BUSINESS MACHINES CORPORATION, Armonk, NY (US)

(72) Inventors: Jesus Diaz Vico, Madrid (ES); Elli Androulaki, Zurich (CH); Ilie Circiumaru, Zurich (CH); Alessandro Sorniotti, Zurich (CH); Marko Vukolić, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 17/649,094

(22) Filed: Jan. 27, 2022

(65) Prior Publication Data

US 2023/0239137 A1 Jul. 27, 2023

(51) Int. Cl.
*H04L 29/06* (2006.01)
*G06K 19/06* (2006.01)
*H04L 9/06* (2006.01)

(52) U.S. Cl.
CPC ...... *H04L 9/0643* (2013.01); *G06K 19/06037* (2013.01); *H04L 2209/16* (2013.01)

(58) Field of Classification Search
CPC . H04L 9/0643; H04L 2209/16; H04L 9/3239; H04L 9/065; H04L 9/14; G06K 19/06037
See application file for complete search history.

(56) References Cited

U.S. PATENT DOCUMENTS

| | | | |
|---|---|---|---|
| 2011/0283359 A1* | 11/2011 | Prince | H04L 63/1433 726/23 |
| 2014/0210589 A1 | 7/2014 | Grace | |
| 2016/0203336 A1* | 7/2016 | Nambiar | G06F 21/6245 726/26 |
| 2017/0169422 A1* | 6/2017 | Ye | H04L 9/3234 |
| 2018/0219680 A1 | 8/2018 | Kamal | |
| 2019/0114448 A1 | 4/2019 | Pastrana | |
| 2019/0354716 A1* | 11/2019 | Basava | G06F 16/2379 |

FOREIGN PATENT DOCUMENTS

CN 106034031 B 4/2020

OTHER PUBLICATIONS

Deswarte et al., "Towards a privacy-preserving national identity card", ResearchGate, Sep. 2009, https://dl.acm.org/doi/abs/10.1007/978-3-642-11207-2_5, pp. 1-21.

(Continued)

*Primary Examiner* — Kendall Dolly
(74) *Attorney, Agent, or Firm* — Stephen R. Yoder

(57) ABSTRACT

The present invention is directed to a computer-implemented method for linking identity information of a physical identifier to a digital identifier. The identity information comprises a plurality of symbols. The method comprises cryptographically obfuscating one or more symbols of the identity information separately into an obfuscated symbol such that a separate deobfuscation information is needed for each obfuscated symbol to deobfuscate it and storing the obfuscated symbols within the digital identifier.

20 Claims, 6 Drawing Sheets

(56) References Cited

OTHER PUBLICATIONS

Jhingan, "The anatomy of ID Card frauds and how you can easily stop it with secure QR Codes", The Times of India, https://timesofindia.indiatimes.com/blogs/reimagining-document-security-with-qr-codes/the-anatomy-of-id-card-frauds-and-how-you-can-easily-stop-it-with-secure-qr-codes/, Mar. 5, 2019, pp. 1-7.
Mell et al., "The NIST Definition of Cloud Computing", National Institute of Standards and Technology, Special Publication 800-145, Sep. 2011, pp. 1-7.

* cited by examiner

300

LINKING A PHYSICAL IDENTIFIER TO A DIGITAL IDENTIFIER

BACKGROUND

The present invention relates to linking identity information, and more particularly, to linking a physical identifier to a digital identifier.

Identification is a process that is increasingly digitalized. However, it is frequently a legal requirement to bind this digital identification process with an identifier available only in physical form. For instance, an individual may be issued a QR code containing a ticket for a concert at a theatre, but in order to access the theatre, the individual needs to show their government-issued ID card, the number of which must match a number in the QR code. Showing the government-issued ID card (physical ID) carries little privacy risk, as an identity thief would need to record the physically shown ID in order to threaten the privacy of the individual. However, showing the QR code is done digitally, and if the QR code contains a government-issued identifier, then the software or service that processes these QR codes may become a target to monitor which individuals access a given service and/or a location of access. This may threaten the privacy of individuals using QR codes.

SUMMARY

According to an exemplary embodiment of the present invention, provided is a computer-implemented method for linking identity information of a physical identifier to a digital identifier. The identity information includes a plurality of symbols. The method includes cryptographically obfuscating one or more symbols of the identity information separately into an obfuscated symbol such that a separate deobfuscation information is needed for each obfuscated symbol to deobfuscate it and storing the obfuscated symbols within the digital identifier.

According to an exemplary embodiment of the present invention, provided is an electronic system for validating a digital identifier by means of a physical identifier is provided. The physical identifier includes identity information including a plurality of symbols. The electronic system includes a user device configured to run a user software, a verification device configured to run a verification software, one or more computer processors, and one or more computer-readable storage media. Program instructions are stored on the one or more of the computer-readable storage media for execution by at least one of the one or more processors, the program instructions including a method. The method includes cryptographically obfuscating, by the user software, one or more symbols of the identity information separately into an obfuscated symbol such that a separate deobfuscation information is needed for each obfuscated symbol to deobfuscate it. The electronic system is further configured to store, by the user software, the obfuscated symbols within the digital identifier and to receive, by the verification software, the digital identifier. The electronic system is further configured to submit, by the user software, the deobfuscation information of a subset of the obfuscated symbols of the identity information to the verification device and to deobfuscate, by the verification software, the subset of the obfuscated symbols.

According an exemplary embodiment of the present invention, a computer program product for linking identity information of a physical identifier to a digital identifier is provided. The identity information includes a plurality of symbols. The computer program product includes a computer readable storage medium having program instructions embodied therewith, the program instructions executable by a user device to cause the user device to perform a method. The method includes cryptographically obfuscating one or more symbols of the identity information separately into an obfuscated symbol such that a separate deobfuscation information is needed for each obfuscated symbol to deobfuscate it, and storing the obfuscated symbols within the digital identifier.

Exemplary embodiments of the present invention will be described in more detail below, by way of illustrative and non-limiting examples, with reference to the accompanying drawings.

DETAILED DESCRIPTION

Figure 1:
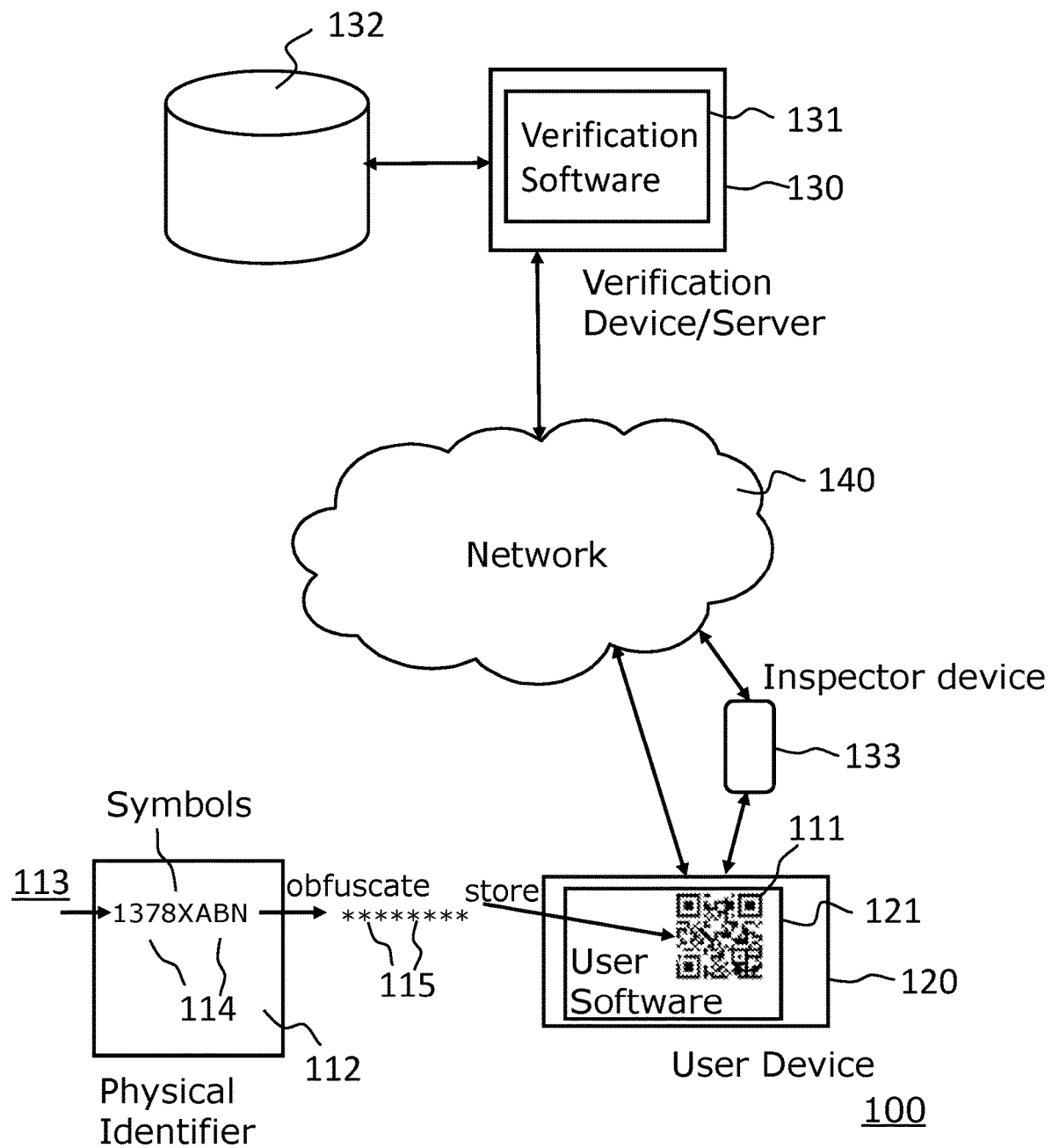
FIG. 1 shows a schematic block diagram of an electronic system 100 used to link a physical identifier to a digital identifier, according to an exemplary embodiment of the present invention.

FIG. 1 is a schematic block diagram of an electronic system 100 used to link a physical identifier 112 to a digital identifier 111, according to an exemplary embodiment of the present invention. The electronic system 100 is configured to validate a digital identifier 111 by means of a physical identifier 112. The electronic system 100 includes a user device 120 that may be operated by a private or commercial user. The user device 120 is configured to run a user software 121. The physical identifier 112 may include identity information 113. The identity information 113 may include a plurality of symbols 114 (e.g., numbers, letters, etc.).

The electronic system 100 may include a verification device/server 130 configured to run a verification software 131. The verification device/server 130 may be coupled to a database 132.

The user device 120 and the verification device/server 130 may be coupled to each other by means of a network 140 and may communicate with each other and exchange messages with each other via the network 140. The network 140 may be e.g., the Internet.

The physical identifier 112 may be an identifier issued by a government. According to exemplary embodiments of the present invention, the physical identifier 112 may be an identification card, a passport, a driver's license, a credit card or a debit card.

The digital identifier 111 may be embodied (e.g., as a QR code, barcode, scannable image, etc.). For example, the digital identifier 111 may be an electronic ticket or a part of an electronic ticket.

According to an exemplary embodiment of the present invention, the digital identifier 111 may be linked to the physical identifier 112. More particularly, the digital identifier 111 may include information of the physical identifier 112. The identity information 113 may be integrated (or in other words stored) in the digital identifier 111 in an obfuscated manner or form. As an example, if the physical identifier 112 is embodied as a passport, the identity information 113 may be the passport number. Some or all the symbols 114 of the identity information 113 may be integrated into the digital identifier 111. According to embodiments, the identity information 113 is integrated or in other words stored in the digital identifier 111 in an obfuscated manner or form.

More particularly, according to an exemplary embodiment of the present invention, the user software 121 may be configured to cryptographically obfuscate one or more symbols 114. For example, each symbol 114 of the identity information 113 may be separately obfuscated into an obfuscated symbol 115 such that separate deobfuscation information is needed for each obfuscated symbol 115 to deobfuscate it. The separately obfuscated symbols may then be stored by the user software 121 within the digital identifier 111.

As an example, if the user buys a ticket from a service provider, the service provider may ask the user to enter the identification information of their physical identifier 112. According to an exemplary embodiment of the present invention, the user does not enter the identification information in plaintext but may use the user software 121 to obfuscate each symbol 114 of the physical identifier 112 separately and then provide the obfuscated symbols 115 to the service provider. The service provider may then issue the digital identifier 111 with the integrated obfuscated symbols 115 and the user software 121 may then store the digital identifier 111 on the user device 120.

If a user wants to then use their digital identifier 111, they may present it, e.g., to an inspector device 133 which may be operated, e.g., by an inspector (e.g., a ticket inspector). The inspector device 133 may be, e.g., a smartphone that is configured to scan the digital identifier 111 (e.g., a barcode) and connect with the verification device/server 130. The verification software 131 may randomly request the deobfuscation information for a subset of the obfuscated symbols 115 of the identity information 113. The user software 121 may then submit (or in other words send) the deobfuscation information of the subset of obfuscated symbols 115 to the verification device/server 130. This may be done either directly, via the network 140, or via the inspector device 133. The verification software 131 of the verification device/server 130 may then deobfuscate the subset of the obfuscated symbols 115 and provide the deobfuscated symbols to the inspector device 133. The inspector device 133 may then compare the deobfuscated symbols of the identity information 113 included in the digital identifier 111 with the symbols 114 of the physical identifier 112 and thereby verify the validity of the digital identifier 111.

According to an exemplary embodiment of the present invention, the verification software 131 may run on the inspector device 133.

Hence, according to an exemplary embodiment of the present invention, instead of storing the symbols 114 of the physical identifier 112 in clear text inside the digital identifier 111 (e.g., inside the QR code) the symbols 114 may be stored as obfuscated symbols 115 using different obfuscation information (e.g., a different key per symbol). This allows the physical identifier 112 to be shown as usual, but when the digital identifier 111 including the obfuscated symbols 115 is shared, only a randomly chosen subset of the obfuscated symbols 115 and the corresponding deobfuscation information is revealed.

According to an exemplary embodiment of the present invention, the obfuscation may be performed by means of a set of encryption keys. More particularly, each symbol 114 of the identity information 113 may be encrypted by means of a different encryption key per symbol. The encryption keys of the set of encryption keys may be in particular encryption keys of a symmetric encryption scheme.

According to an exemplary embodiment of the present invention, cryptographic hashing may be used instead of encryption. According to such an embodiment, each symbol 114 may be hashed along with a random number (a different random number per symbol). When sharing the digital identifier 111, only the random numbers used to hash the chosen subset of symbols may be revealed.

According to an exemplary embodiment of the present invention, the symbols 114 to be revealed may change each time the digital identifier 111 is shared. Hence the probability that a holder finds colliding physical identifiers 112 may be effectively reduced, albeit it is never zero unless all symbols 114 are requested.

According to an exemplary embodiment of the present invention, a verifier may learn nothing about the symbols 114 for which the encryption key, or in the method using hashes, the random number has not been revealed. This prevents digital tracking of the activities of the holder of the digital identifier 111.

In addition, as bar codes/QR-codes are often posted on social media, exemplary embodiments of the present invention may protect against misuse of such posted bar codes/QR-codes.

Furthermore, exemplary embodiments of the present invention may be implemented efficiently as no advanced cryptographic functionality is required. As an example, upon deobfuscating the obfuscated symbols 115 received from the digital identifier 111, the verification software 131 may show, e.g., only 4 out of 9 digits of the identity information 113, e.g., 98***4*2*. Then the operator of the verification software 131 (e.g., the inspector of the ticket) just needs to check whether the symbols 114/digits shown in clear match those of the physical identifier 112.

In the following, a more detailed description of an exemplary embodiment of the present invention using symmetric encryption is presented. For ease of explanation, examples of this embodiment involve a user's driving license having 987654321 as the identity information 113. The user or the user software 121 may randomly produce a different symmetric sk key for each of the symbols 114, i.e., for each of the digits. To minimize the number of sk keys to remember/store, producing the different symmetric sk keys may be done with a process as follows. The separate encryption sk keys sk_x for each digit x may be computed as:

sk_digit1=hash (0, password)
sk_digit2=hash (1, password)
sk_digit9=hash (8, password), wherein "hash" may generally denote appropriate key derivation functions.

Then, in the digital identifier 111 (e.g., in the QR code) the following may be written instead of writing the plaintext 123456789:

senc (sk_digit1, 9), senc(sk_digit2, 8), . . . , senc (sk_digit9, 1), wherein "senc (sk_digitk, d)" denotes symmetric encryption with sk_digitk of data "d".

Upon sharing the digital identifier 111 with the verification software 131, the verification software 131 may randomly produce a subset of the digits via some random generation process. As an example, the verification software 131 may request digits from positions 3, 6, 7 and 9 (i.e., corresponding to 7, 4, 3 and 1, respectively). Then, the user software 121 of the user/holder may share the following keys:

sk_digit3=hash (2, password)
sk_digit6=hash (5, password)
sk_digit7=hash (6, password)
sk_digit9=hash (8, password)

With those four keys, the verification software 131 can decrypt the corresponding encrypted digits by computing:

digit3'=sdec(sk_digit3, senc(sk_digit3, 7)=7
digit6'=sdec(sk_digit6, senc(sk_digit6, 4)=4
digit7'=sdec(sk_digit7, senc(sk_digit7, 3)=3
digit9'=sdec(sk_digit9, senc(sk_digit9, 1)=1, wherein "sdec(sk_digitk, c)" means symmetric decryption with key sk_digitk of ciphertext "c".

Consequently, the operator of the verification software 131, e.g., the ticket inspector, can check that the decrypted digits of the digital identifier 111 match the ones in the physical identifier 112 being shown by the user/holder. As an example, the ticket inspector may check if digit3' equals the third digit in the physical identifier 112, and so on.

According to an exemplary embodiment of the present invention, the user and/or the user software 121 may get involved in the process of randomly picking the symbols 114/digits to be shown. As an example, the user software 121 which is running on the user device 120 (e.g., a smartphone) may randomly choose the symbols 114/digits to be shown. Such an embodiment may prevent a corrupt verifier from maliciously picking the digits to be shared. This may be particularly important in a scenario such as when a user recurrently uses the same digital identifier 111/QR code for verification purposes (e.g., to access some place).

A detailed description of an exemplary embodiment of the present invention using cryptographic hashes is presented hereafter. For this embodiment, it is again assumed for ease of explanation that the user has the driving license with the identity information 113 of 987654321.

According to this exemplary embodiment of the present invention, at first 9 random numbers randx are produced as follows (e.g., by the user software 121):

rand1=hash (1, password)
rand2=hash (2, password)
rand3=hash (3, password)
rand4=hash (4, password)
rand5=hash (5, password)
rand6=hash (6, password)
rand7=hash (7, password)
rand8=hash (8, password)
rand9=hash (9, password)

A pseudo random function (PRF) may be used to produce the (pseudo-) random numbers from a password. This is a cryptographic functionality, which can be implemented very efficiently by using hash functions.

Then, instead of writing the symbols 114 in clear text, the symbols 114/digits may be written as follows into the digital identifier 111 (e.g., by the user software 121):

hdigit1=hash (9, rand1), hdigit2=hash (8, rand2), . . . , hdigit9=hash (1, rand9)

Finally, when the user (credential owner) shows the digital identifier 111 (e.g., the QR code) to the verifier, only a subset of the plurality of symbols 114/digits is chosen. When assuming as an example that the chosen digits are again 3, 6, 7 and 9, then the user (owner of the credential) shares the digital identifier 111/QR code as well as the corresponding random numbers, i.e., rand3, rand6, rand7 and rand9. In this case, the user (credential owner) must also share the plaintext values of the chosen symbols 114/digits (i.e., 7, 4, 3, and 1 respectively).

The verification software 131 may then perform the verification as follows:

hdigit3'=hash (7, rand3)
hdigit6'=hash (4, rand6)
hdigit7'=hash (3, rand7)
hdigit9'=hash (1, rand9)

The verification software 131 may then perform a positive verification if the resulting hashes match the ones written into the digital identifier 111/QR code, e.g., if hdigit3' equals hdigit3, hdigit6' equals hdigit6, and so on.

Figure 2:
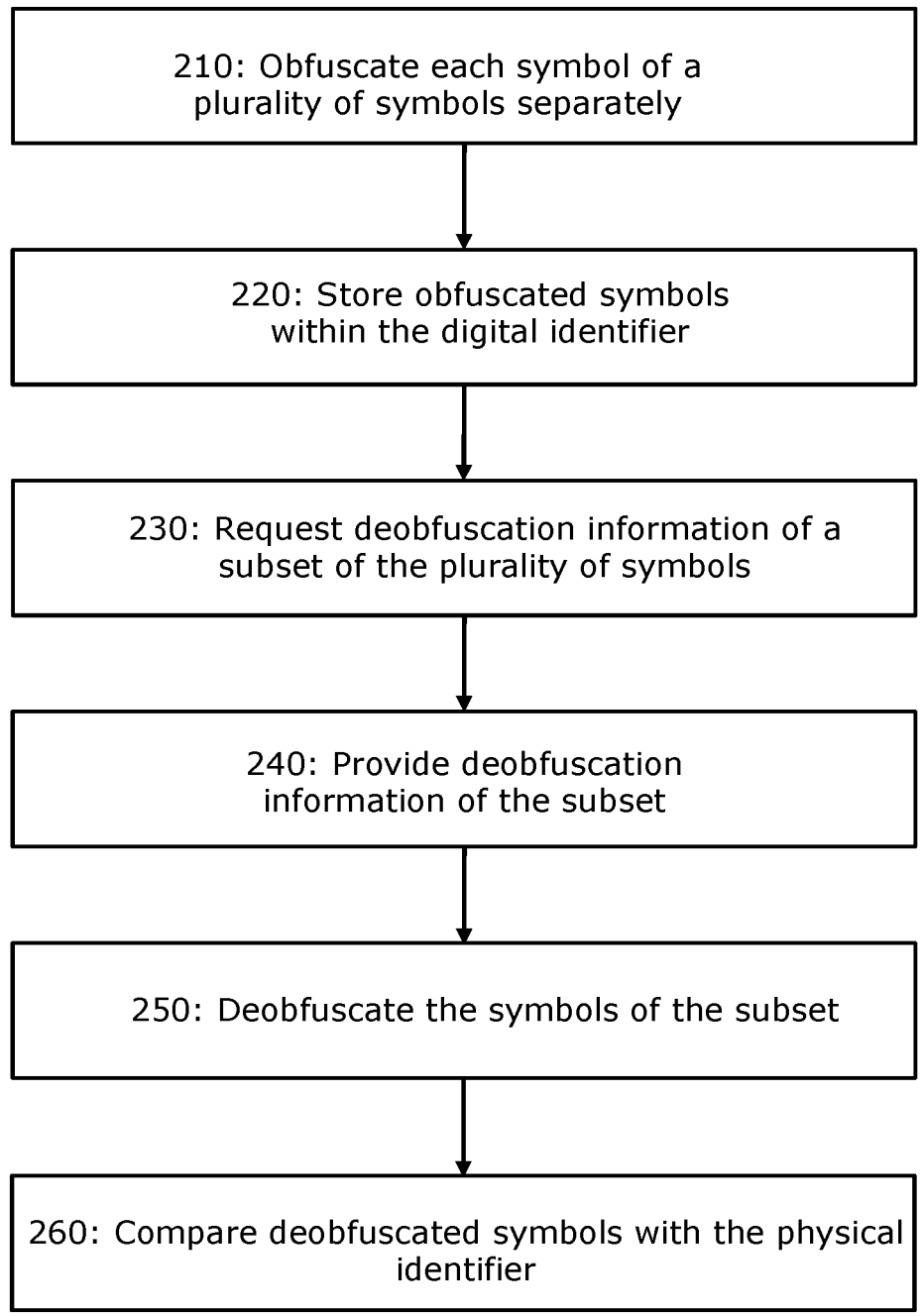
FIG. 2 shows a flow chart of a computer-implemented method 200 of linking a physical identifier to a digital identifier, according to an exemplary embodiment of the present invention.

FIG. 2 shows a flow chart of a computer-implemented method of linking identity information of a physical identifier 112 to a digital identifier 111, according to an exemplary embodiment of the present invention. The computer-implemented method may be, e.g., performed in the system 100 as described above. Accordingly, in the following description of the computer-implemented method it may be referred back to the components of the system 100.

The user software 121 of the user device 120 may cryptographically obfuscate each symbol 114 of the plurality of symbols 114 separately (step 210). In other words, each symbol 114 of the identity information 113 of the physical identifier 112 may be separately obfuscated into an obfuscated symbol 115. Thus, separate deobfuscation information is needed for each obfuscated symbol 115 to deobfuscate it. The user software 121 of the user device 120 may cryptographically obfuscate each symbol 114 of the identity information 113 of the physical identifier 112 into an obfuscated symbol 115.

The user software 121 may store the obfuscated symbols 115 within the digital identifier 111 (step 220).

The verification software 131 may request the deobfuscation information of a subset of the plurality of symbols 114 (step 230).

The user software 121 may provide the requested deobfuscation information of the subset of the plurality of symbols 114 to the verification software 131 (step 240).

The verification software 131 may deobfuscate the obfuscated symbols 115 of the subset (step 250) using the received deobfuscation information. The verification software 131 may present the deobfuscated symbols, e.g., on a display of the inspector device 133.

An operator, e.g., a ticket inspector, may compare the deobfuscated symbols with the symbols 114 of the physical identifier 112 (step 260). If the deobfuscated symbols and the symbols 114 match, the operator may accept the ticket.

Figure 3:
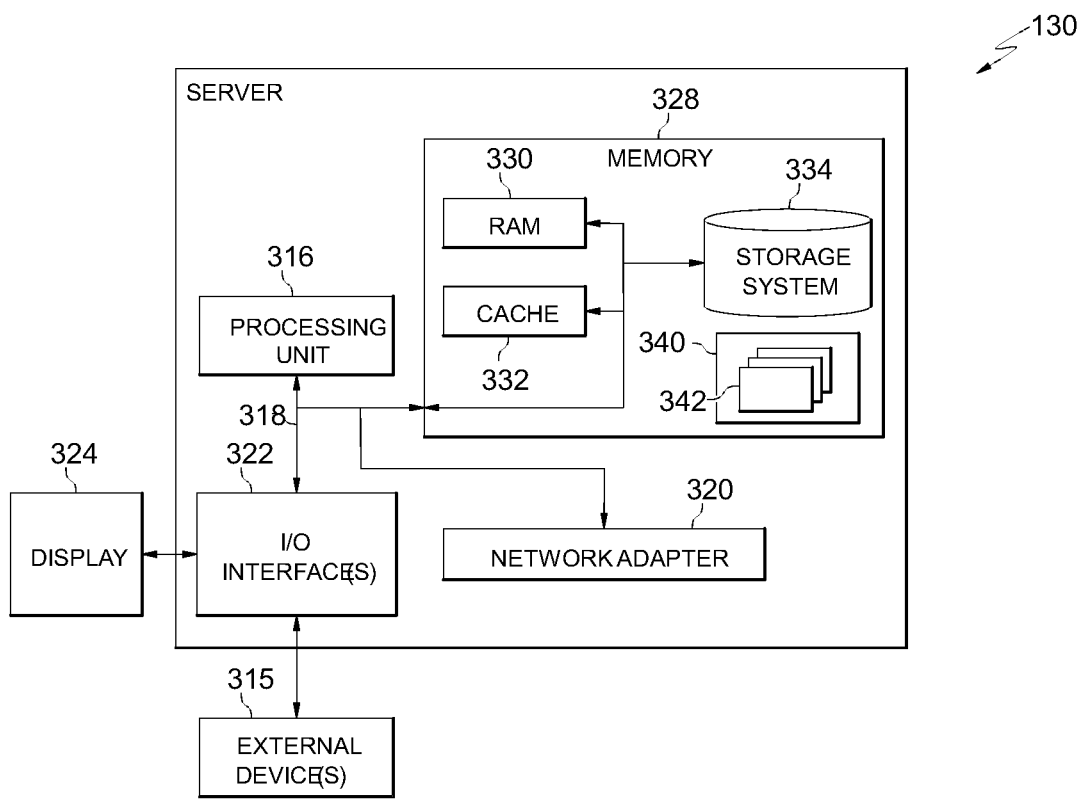
FIG. 3 shows a detailed block diagram of a verification device/server 300, according to an exemplary embodiment of the present invention.

FIG. 3 shows a detailed block diagram of the verification device/server 130, according to an exemplary embodiment of the present invention. The verification device/server 130 may be integrated with numerous other general purpose or special purpose computing system environments or configurations. Examples of computing systems, environments, and/or configurations that may be suitable for use with verification device/server 130 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In particular, the verification device/server 130 may be operated with user devices 120 and/or inspector devices 133.

The verification device/server 130 may be described in the general context of computer system-executable instructions, such as program modules, being executed by a computer system. Generally, program modules may include routines, programs, objects, components, logic, data structures, and so on that perform particular tasks or implement particular abstract data types. The verification device/server 130 is shown in the form of a general-purpose computing device. The components of the verification device/server 130 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The verification device/server 130 may include a variety of computer system readable media. Such media may be any available media that is accessible by server 130, and may include both volatile and non-volatile media, removable and non-removable media.

System memory 328 can include computer system readable media in the form of volatile memory, such as random access memory (RAM) 330 and/or cache memory 332. The verification device/server 130 may further include other removable/non-removable, volatile/non-volatile computer system storage media. By way of example only, storage system 334 can be provided for reading from and writing to a non-removable, non-volatile magnetic media (e.g., a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. The program modules 342 may carry out the functions and/or methodologies of embodiments of the invention as described herein, in particular the verification software 131.

The verification device/server 130 may also communicate with one or more external devices 315 such as a keyboard, a pointing device, a display 324, etc.; one or more devices that enable a user to interact with the verification device/server 130; and/or any devices (e.g., network card, modem, etc.) that enable the verification device/server 130 to communicate with one or more other computing devices. Such communication can occur via Input/Output (I/O) interfaces 322. The verification device/server 130 can communicate with one or more networks such as a local area network (LAN), a general wide area network (WAN), and/or a public network (e.g., the Internet) via network adapter 320. As depicted, network adapter 320 may communicate with the other components of server 130 via bus 318. It should be understood that other hardware and/or software components could be used in conjunction with the verification device/server 130. Examples, include, but are not limited to: microcode, device drivers, redundant processing units, external disk drive arrays, RAID systems, tape drives, and data archival storage systems, etc.

Figure 4:
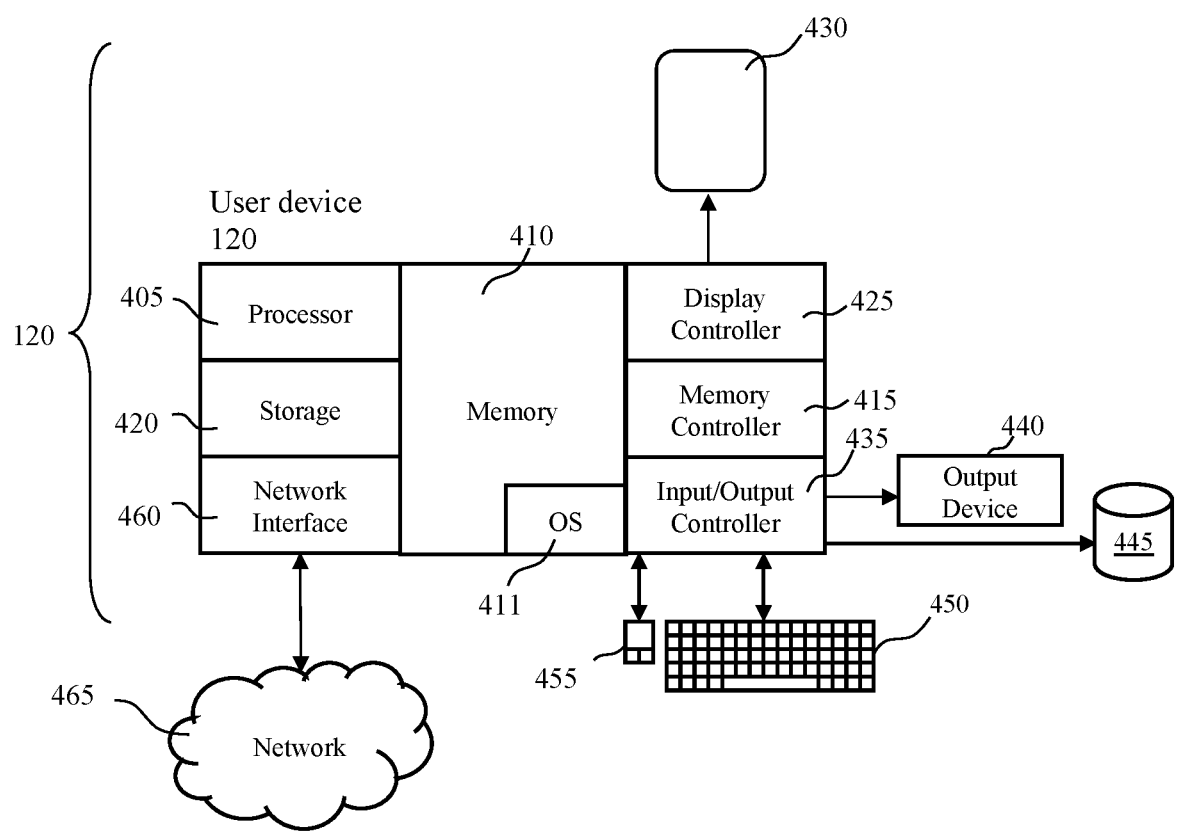
FIG. 4 shows a detailed block diagram of a user device 120, according to an exemplary embodiment of the present invention.

FIG. 4 shows a detailed block diagram of the user device 120 and/or inspector device 133, according to an exemplary embodiment of the present invention. In an exemplary embodiment of the present invention, in terms of hardware architecture, the user device 120 may include a processor 405, memory 410 coupled to a memory controller 415, and one or more input and/or output (I/O) devices 440, 445, 450, 455 (or peripherals) that are communicatively coupled via a local input/output controller 435. The input/output controller 435 can be, but is not limited to, one or more buses or other wired or wireless connections. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 may be a hardware device for executing software, such as that stored in memory 410. The processor 405 can be any custom made or commercially available processor, a central processing unit (CPU), an auxiliary processor among several processors associated with the computer 401, a semiconductor-based microprocessor (in the form of a microchip or chip set), or any device for executing software instructions.

The memory 410 can include any one or combination of volatile memory elements (e.g., random access memory) and nonvolatile memory elements. Moreover, the memory 410 may incorporate electronic, magnetic, optical, and/or other types of storage media. Note that the memory 410 can have a distributed architecture, where various components are situated remote from one another, but can be accessed by the processor 405.

The software in memory 410 may include one or more separate programs, in particular the embodied user software 121. In the example of FIG. 4, the software in the memory 410 may include methods described herein in accordance with exemplary embodiments and a suitable operating system (OS) 411. The OS 411 may essentially control the execution of other computer programs, such as the methods as described herein, and provides scheduling, input-output control, file and data management, memory management, and communication control and related services.

A conventional keyboard 450, a touchscreen 430, and a mouse 455 can be coupled to the input/output controller 435. Other I/O devices 440-455 may include sensors (especially in the case of network elements), i.e., hardware devices that produce a measurable response to a change in a physical condition like temperature or pressure (physical data to be monitored). The analog signal produced by the sensors may be digitized by an analog-to-digital converter and sent to controllers 435 for further processing.

In addition, the I/O devices 440-455 may further include devices that communicate both inputs and outputs. The system 100 can further include a display controller 425 coupled to a display 440. In exemplary embodiments, the system 400 can further include a network interface or transceiver 460 for coupling to a network 465.

The network 465 may transmit and receive data between the user device 120 and external systems, in particular the server 130 as described above. The network 465 is possibly implemented in a wireless fashion, e.g., using wireless protocols and technologies, such as WiFi, WiMax, etc. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 465 can also be an IP-based network for communication between the unit 401 and any external server, client and the like via a broadband connection, in particular with the verification server 130 as described above. In exemplary embodiments, network 465 can be a managed IP network administered by a service provider. Besides, the network 465 can be a packet-switched network such as a LAN, WAN, Internet network, etc.

If the user device 120 is a PC, workstation, smartphone, intelligent device or the like, the software in the memory 410 may further include a basic input output system (BIOS). The BIOS may be stored in ROM so that the BIOS can be executed when the user device 120 is activated.

When the user device 120 is in operation, the processor 405 may be configured to execute software stored within the memory 410, in particular the user software 121, to communicate data to and from the memory 410, and to generally control operations of the user device 120 pursuant to the software. The methods described herein, in whole or in part, may be read by the processor 405, buffered within the processor 405, and then executed.

The present invention may be a system, a method, and/or a computer program product. The computer program product may include a computer readable storage medium (or media) having computer readable program instructions thereon for causing a processor/processing unit of verification device/server 130 and/or the user device 120 and/or the inspector device 133 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 5:
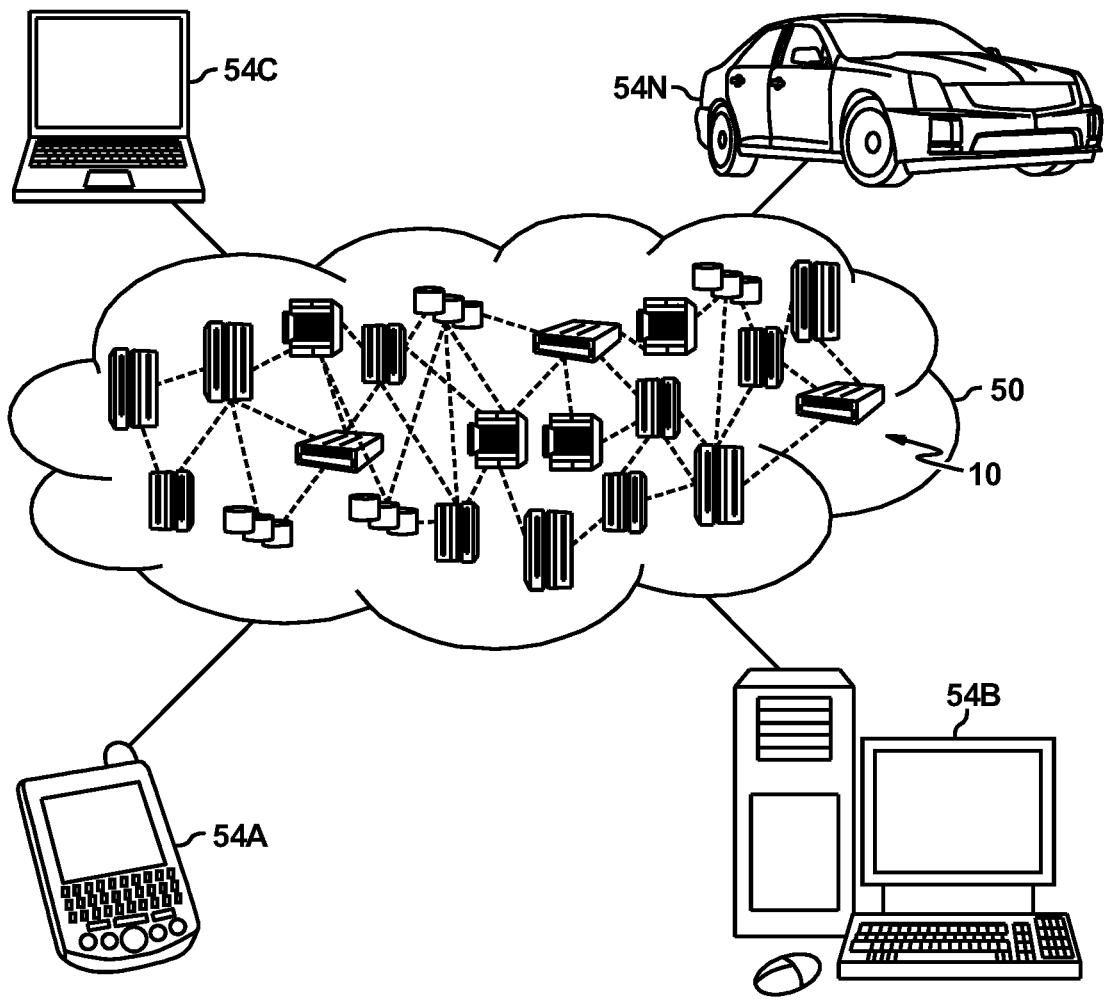
FIG. 5 depicts a cloud computing environment according to an exemplary embodiment of the present invention.

FIG. 5 depicts a cloud computing environment according to an exemplary embodiment of the present invention.

Figure 6:
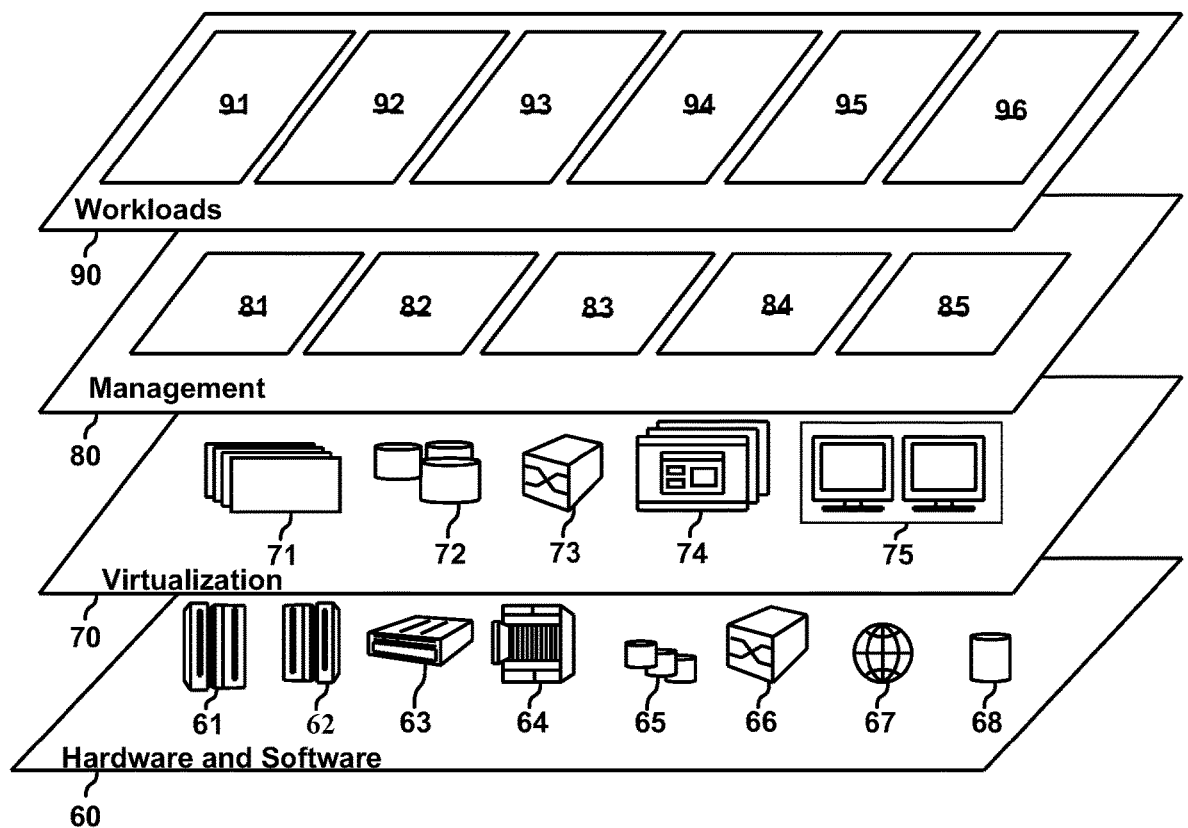
FIG. 6 depicts abstraction model layers according to an exemplary embodiment of the present invention.

FIG. 6 depicts abstraction model layers according to an exemplary embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and linking a physical identifier to a digital identifier processing 96.

What is claimed is:

1. A computer-implemented method for linking identity information of a physical identifier to a digital identifier, the identity information comprising a plurality of symbols, the method comprising:
    cryptographically obfuscating a plurality of symbols whose combination is equal to identity information of a physical identifier, the plurality of symbols being separately obfuscated, each respective obfuscated symbol requiring individual deobfuscation information; and
    storing the obfuscated plurality of symbols integrated into the identity information within a digital identifier.

2. The computer-implemented method according to claim 1, further comprising:
    revealing only deobfuscation information of a subset of the plurality of obfuscated symbols.

3. The computer-implemented method according to claim 2, further comprising:
    choosing the subset of the obfuscated symbols randomly.

4. The computer-implemented method according to claim 2, the method further comprising:
    submitting, by a user software, the deobfuscation information of the subset to a verification software; and
    deobfuscating, by the verification software, the subset of the obfuscated symbols.

5. The computer-implemented method according to claim 3, wherein the choosing the subset of the obfuscated symbols randomly is performed by a verification software.

6. The computer-implemented method according to claim 3, wherein the choosing the subset of the obfuscated symbols randomly is performed by a user software.

7. The computer-implemented method according to claim 1, wherein cryptographically obfuscating the plurality of symbols comprises:
    providing a set of encryption keys; and
    encrypting the plurality of symbols using multiple keys of the set of encryption keys.

8. The computer-implemented method according to claim 7, wherein the encryption keys of the set of encryption keys are encryption keys of a symmetric encryption scheme.

9. The computer-implemented method according to claim 1, wherein cryptographically obfuscating the plurality of symbols comprises:
    hashing the plurality of symbols along with a random number per symbol.

10. The computer-implemented method according to claim 1, wherein the digital identifier is a barcode.

11. The computer-implemented method according to claim 1, wherein the physical identifier is an identifier issued by a government.

12. The computer-implemented method according to claim 1, wherein the physical identifier is an identification card, a passport, a driver's license, a credit card or a debit card.

13. An electronic system for validating a digital identifier using a physical identifier, the physical identifier including identity information represented by a plurality of symbols, the electronic system comprising:

- a user device comprising a processor to run a user software,
- a verification device comprising a processor to run a verification software, one or more computer processors, computer-readable storage media, and
- program instructions stored on the computer-readable storage media, when executed by at least one of the one or more computer processor cause the one or more computer processors to perform a method comprising:
- cryptographically obfuscating, by the user software, a plurality of symbols whose combination is equal to identity information of a physical identifier, the plurality of symbols being separately obfuscated, each respective obfuscated symbol requiring individual deobfuscation information;
- storing, by the user software, the obfuscated plurality of symbols integrated into the identity information within a digital identifier;
- receiving, by the verification software, the digital identifier;
- submitting, by the user software, the deobfuscation information of a subset of the obfuscated symbols of the identity information to the verification device; and
- deobfuscating, by the verification software, the subset of the obfuscated symbols.

14. An electronic system according to claim 13, further comprising:

- requesting, by the verification software, the subset of the obfuscated symbols.

15. An electronic system according to claim 13, wherein further comprising:

- determining, by the user software, the subset of the obfuscated symbols to be submitted for verification.

16. The electronic system according to claim 13, wherein the cryptographically obfuscating plurality of symbols of the identity information separately into an obfuscated symbol is performed by the user software and further comprises:

- providing a set of encryption keys; and
- encrypting the plurality of symbols using multiple keys of the set of encryption keys.

17. The electronic system according to claim 16, wherein the encryption keys of the set of encryption keys are encryption keys of a symmetric encryption scheme.

18. The electronic system according to claim 13, wherein the cryptographically obfuscating plurality of symbols of the identity information separately into an obfuscated symbol is performed by the user software by:

- hashing the plurality of symbols along with a random number per symbol.

19. A computer program product for linking identity information of a physical identifier to a digital identifier, the identity information including a plurality of symbols, the computer program product comprising:

- a computer readable storage medium having program instructions embodied therewith, the program instructions, when executable by a user device, cause the user device to perform a method comprising:
  - cryptographically obfuscating a plurality of symbols whose combination is equal to identity information of a physical identifier, the plurality of symbols being separately obfuscated, each respective obfuscated symbol requiring individual deobfuscation information; and
  - storing the obfuscated plurality of symbols integrated into the identity information within a digital identifier.

20. The computer program product according to claim 19, wherein the method further comprises:

- revealing only deobfuscation information of a subset of the plurality of obfuscated symbols.

* * * * *